US012617432B2

(12) United States Patent
Bender et al.

(10) Patent No.: US 12,617,432 B2
(45) Date of Patent: May 5, 2026

(54) COMPUTER-IMPLEMENTED METHOD FOR PROVIDING COMPUTING POWER FROM A COMPUTING UNIT OF A VEHICLE, CONTROL UNIT AND VEHICLE

(71) Applicant: ZF Friedrichshafen AG, Friedrichshafen (DE)

(72) Inventors: Jörg Bender, Würzburg (DE); Johannes Mantel, Gochsheim (DE); Tobias Höche, Hallstadt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 95 days.

(21) Appl. No.: 18/525,204

(22) Filed: Nov. 30, 2023

(65) Prior Publication Data

US 2024/0174261 A1     May 30, 2024

(30) Foreign Application Priority Data

Nov. 30, 2022     (DE) .......................... 102022212889.3

(51) Int. Cl.
*B60W 60/00* (2020.01)
*B60L 58/12* (2019.01)
*G01C 21/34* (2006.01)

(52) U.S. Cl.
CPC ..... *B60W 60/0015* (2020.02); *G01C 21/3469* (2013.01); *B60L 58/12* (2019.02)

(58) Field of Classification Search
CPC .. B60W 60/0015; B60W 50/00; B60W 40/00; G01C 21/3469; B60L 58/12; B60L 53/66; B60R 16/0231; B60R 16/0232
See application file for complete search history.

(56) References Cited

U.S. PATENT DOCUMENTS

| | | | | |
|---|---|---|---|---|
| 2002/0188384 A1* | 12/2002 | Becker | .................. | G06F 9/5072 |
| | | | | 701/1 |
| 2012/0240113 A1* | 9/2012 | Hur | ..................... | G06F 9/45558 |
| | | | | 718/1 |
| 2014/0129139 A1* | 5/2014 | Ellison | ............... | G06Q 30/0251 |
| | | | | 701/533 |
| 2015/0112507 A1 | 4/2015 | Loewel et al. | | |

(Continued)

FOREIGN PATENT DOCUMENTS

| | | |
|---|---|---|
| DE | 10 2017 008 956 A1 | 3/2018 |
| DE | 10 2017 201 789 A1 | 8/2018 |

(Continued)

OTHER PUBLICATIONS

Office Action dated Jul. 4, 2023 for German Patent Application No. 10 2022 212 889.3 (11 pp.), note: pp. 1 and 2 are English language Explanations to Section C. Result of Determination Document.

*Primary Examiner* — Khoi H Tran
*Assistant Examiner* — Tristan J Greiner
(74) *Attorney, Agent, or Firm* — Crowell & Moring LLP

(57) ABSTRACT

A computer-implemented method for providing computing power of a computing unit of a vehicle having an energy storage unit includes recording or acquiring operating information of the vehicle, determining status data based on the operating information of the vehicle, and providing computing power from the computing unit of the vehicle, based on the status data. A control unit and a vehicle are also provided.

20 Claims, 5 Drawing Sheets

(56) References Cited

U.S. PATENT DOCUMENTS

| 2017/0201570 A1* | 7/2017 | Reber | .................. | G06F 9/5094 |
| 2021/0094436 A1* | 4/2021 | Weber | .................. | B60L 53/302 |
| 2021/0114472 A1* | 4/2021 | Stephens | ................ | B60L 53/64 |

FOREIGN PATENT DOCUMENTS

| DE | 10 2020 126 282 A1 | 4/2022 |
| EP | 3 676 707 B1 | 9/2018 |

* cited by examiner

COMPUTER-IMPLEMENTED METHOD FOR PROVIDING COMPUTING POWER FROM A COMPUTING UNIT OF A VEHICLE, CONTROL UNIT AND VEHICLE

CROSS-REFERENCE TO RELATED APPLICATION

This application claims priority to German Application No. DE 10 2022 212 889.3, filed on Nov. 30, 2022, the entirety of which is hereby fully incorporated by reference herein.

FIELD

The present disclosure relates to a computer-implemented method for providing computing power from a computing unit of a vehicle having an energy storage unit, and to a control unit for controlling provision of computing power of a vehicle, a set of power electronics for a vehicle, and a vehicle having an energy storage unit.

BACKGROUND AND SUMMARY

For vehicles such as passenger cars, trucks and other vehicles, built-in computing power has increased sharply in recent years. In particular, due to driving functions such as autonomous driving, considerable computing power is sometimes required, which must be held in store in the vehicles. However, the computing power required by the vehicle varies depending on the current driving situation. In other words, it can happen that considerable potential for computing power in a vehicle is unused over long usage periods.

DE 10 2017 008 956 A1 shows a method for using a computing unit of an autonomously movable vehicle. In this method, during a vehicle charging process the computing power of the vehicle computing unit is made available to an external computer network.

In this case, however, the computing power is provided only during a charging process and free computing capacity remains unused during operation of the vehicle.

Therefore, it is an object of the present disclosure to provide a method and a device in which the computing power of a vehicle can be used efficiently.

This problem is solved with a computer-implemented method having the features disclosed herein, with a control unit having the features disclosed herein, and with a vehicle having the features disclosed herein.

According to one aspect of the present disclosure, a computer-implemented method is provided for providing computing power from a computing unit of a vehicle having an energy storage unit, said method comprising: recording or acquiring operating information of the vehicle, determining status data based on the operating information of the vehicle, and providing computing power from the computing unit of the vehicle based on the status data.

Compared to the known prior art, the present disclosure offers the advantage that the computing power can be provided not only when the vehicle is not in use, but also during operation (for example, driving) of the vehicle. Since during operation of the vehicle the computing unit is also required to ensure certain functions for the operation of the vehicle, the supplied computing power can be provided in accordance with status data. Thus, it is possible to guarantee both a) a safe operation of the vehicle and b) provision of unneeded computing power for external calculation processes, for example. This means that optimal utilization of the computing unit can be achieved not only while the vehicle is not in use. The status data may include information about the operating state of the vehicle, so that the computing power can be provided dynamically and individually adapted to the current status of the vehicle. This ensures efficient use of the computing power even during operation of the vehicle without impairing vehicle functions.

The vehicle may be an electric vehicle, a hybrid vehicle, a hydrogen-powered vehicle or the like. In particular, the vehicle can be a passenger car or a truck. However, it is conceivable to apply the present disclosure to all vehicles that have a computing unit. The energy storage unit of the vehicle may be designed to be operated with a secondary energy source. In particular, the energy store may be an accumulator for storing electricity, a hydrogen tank for storing hydrogen, and the like. Furthermore, the vehicle may be designed to drive at least partially autonomously. In particular, it may be an autonomously operable vehicle. The vehicle can be assigned to one of the autonomy levels 1 to 5. In particular at levels 3 (automated driving), level 4 (fully automated driving) and level 5 (autonomous driving), very high demands are placed on the computing power of the computer unit of the vehicle. Preferably, the vehicle is assigned to one of levels 3 to 5.

The operating information of the vehicle may be acquired vehicle-internally or recorded or acquired by external devices. The operating information of the vehicle can provide information about the current operating status of the vehicle. For example, the operating information can be recorded by a control unit that is connected to the vehicle systems via a CAN bus. In addition, sensors may be provided to record operating information. For example, operational information may be recorded from external devices whenever the vehicle interacts with other devices. For example, during a charging process, the charging station can determine and transmit operating information. Once the operating information has been recorded or acquired, status data can be generated based on the operating information of the vehicle. The status data can be indicative of how much of the computing power of the vehicle computing unit is required for the current operation of the vehicle. For example, the vehicle may be working in automation level 3, where, for example, 20% of the computing power of the computing unit is required to operate the vehicle. In other words, the status data in this case can state that 20% of the computing power of the computing unit is not available and therefore cannot be provided. Thus, when providing computing power from the computing unit, it can be ensured that the unused computing power of the computing unit is provided. More precisely, in the above example, 80% of the computing power of the computing unit can be provided. Thus, the computing power provided by the computing unit can be used for other processes, in particular external processes. External processes can be defined as processes that are not directly required for the operation of the vehicle or functionalities of the vehicle. Preferably, a safety buffer is allowed for, so that when determining status data, a safety buffer of computing power is added to the computing power required for the operation of the vehicle, so that not all of the unused computing power is provided. Thus, it is possible to react to rapidly changing boundary conditions, for example during the operation of the vehicle, without the need to interrupt already executed computing processes by the computing power provided. For example, the security buffer can amount to 10% of the total available computing power of the computing unit. The provision of the computing power can mean that external computing operations not necessary for the operation of the vehicle are carried out with the computing unit. For example, the vehicle can receive computing jobs from external devices or systems and process them using the computing power provided from the computing unit. Preferably, the provided computing power can be combined with sources of computing power provided by other computing units. In other words, the computing unit provided can be made available to a network (such as a cloud network) to process computing jobs. Thus, computing power of the computing unit can be provided on an individual and operationally tailored basis. In other words, the computing power is not provided globally as a specific fixed percentage, but instead the computing power is provided individually on the basis of the status data of the vehicle. This offers the advantage that a high utilization of the computing unit of the vehicle can be achieved at all times without having to accept any operational or functional restrictions on the vehicle.

The computing unit can be a GPU (Graphics Processing Unit) and/or a CPU (Central Processing Unit). Preferably, the computing unit is designed such that it can execute at least 100 TOPS (trillion operations per second), preferably at least 200 TOPS. Furthermore, the computing unit may be designed to perform calculations using neural networks (e.g. deep neuronal networks, DNN), convolutional neural networks (CNN), lambda functions, etc. The computing unit is preferably a computing unit which is already present in the vehicle, such as the power electronics, on-board computer or the computing unit provided for automated driving.

Preferably, the computing power of the computing unit is provided dynamically based on continuously updated status data. In other words, the vehicle operating information is continuously recorded or acquired, and the status data is determined based on it. Due to changes in the operating mode of the vehicle, the status data can also change, whereby a possible computing power that can be provided can also change. As a result, the computing power that is provided can always be precisely dimensioned in such a way that operation of the vehicle is easily possible, even under changing boundary conditions. For example, a user of the vehicle can change the automation level, so that a higher computing power of the computing unit is necessary for the operation of the vehicle. Thus, the proportion of the computing power of the computing unit that can be provided can turn out to be correspondingly lower. This can be taken into account by providing the computing power dynamically so that the computing unit can be utilized efficiently even under dynamically changing boundary conditions.

Preferably, the status data is determined in real time. In other words, the status data is continuously determined, for example, in a cycle of once per second. This allows even short-term changes in the operation of the vehicle to be taken into account. This means the operation of the vehicle and the provision of computing power from the computing unit can be guaranteed.

The operating information preferably comprises the state of charge of the energy storage unit, a status of the energy storage unit, a characterization of the stored energy, a vehicle speed, an automation level of the vehicle, a temperature of the computing unit and/or a vehicle status of the vehicle. The charge state of the energy storage unit, also known as the state of charge (SOC), indicates how much energy is stored in the energy storage unit. For example, in the case of an accumulator, the state of charge can indicate the percentage to which the accumulator is charged with electrical energy. The status of the energy storage unit can take into account, for example, the ageing effects of the energy storage unit. The ageing of an energy storage unit (in particular an accumulator) can be detected, for example, by a voltage test or similar. For example, older accumulators may have a lower voltage and/or capacity than younger ones. Characterizing the stored energy can mean that additional information about the energy is available. For example, the $CO_2$ footprint of the stored energy can be stored and taken into account when determining the status data. In the case of a vehicle powered by hydrogen, this can be stored in the energy storage unit. Hydrogen, for example, may be characterized by whether it is green, blue, or gray hydrogen. Likewise, with an accumulator as an energy storage unit the information as to whether or not it is charged with green electricity or electricity from conventional sources can be stored. The vehicle speed can be the speed at which the vehicle moves relative to the ground. The vehicle speed can have an influence on the computing power required for the operation of the vehicle, such as for a braking assistant or for other assistants, which are activated above a certain speed and/or require increased computing power. Thus, by taking into account the vehicle speed in the status data, the functions and/or computing power necessary for the operation of the vehicle can be taken into account. The degree of automation of the vehicle can take into account how much computing power is required for automated or partially automated operation of the vehicle. For example, less computing power is required for operation of the vehicle in automation level 3 compared to automation level 5. Thus, the status data can take into account how much computing power is currently required for automating the operation of the vehicle.

The temperature of the computing unit can play a role in determining how much computing power can be provided from the computing unit. The higher the computing power, the higher the cooling requirement of a computing unit. Therefore, the information about the temperature of the computing unit can provide information about how much computing power can be provided from the computing unit so that the computing unit can work smoothly and that, for example, no overheating of the computing unit occurs. The vehicle status of the vehicle may be indicative, for example, of whether the vehicle is currently in a parked state, in a charging state, in a driving state, at a standstill or the like. Depending on this, further conclusions can be drawn about the computing power required by the vehicle or the computing power that can be provided by the vehicle. Thus, due to the consideration of the status data, it can be determined with high precision how much computing power can be provided from the computing unit without jeopardizing the operation of the vehicle.

Preferably, the operating information comprises a characterization of the stored energy and the characterization of the stored energy preferably comprises information about the $CO_2$ footprint of the stored energy. Thus, it can be defined how much $CO_2$ is required or consumed by providing the computing power from the computing unit. In addition, the user can determine that computing power is only provided if a specific $CO_2$ footprint for providing the computing unit is not exceeded. Thus, a computing power, which is provided by the computing unit, can be reduced when the energy storage unit is filled with energy which at least partially has a $CO_2$ footprint that is above the limit value. This will allow environmental concerns to be taken into account, so that any legislative requirements can also be met. In addition, an incentive can thus be created to charge energy with a low $CO_2$ footprint into the energy storage unit.

Preferably, the status data is additionally determined based on travel information, wherein the travel information preferably comprises a planned route, the current position of the vehicle, and/or traffic information. Travel information may include information about the planned route of the vehicle. In other words, the computing power provided from the computing unit may depend on how far and/or where the user plans to drive the vehicle. Thus, it can be ensured that the user has the full functionality of their vehicle available without the energy storage becoming empty before reaching the destination, for example, due to excessive provision of computing power. In addition, information on the route can be used as a basis for determining the status data. Thus, it may be, for example, that certain sections of road are present on the route, which require higher computing power or higher energy consumption, so that sufficient energy should be available in the energy storage unit. For example, the current position of the vehicle may be indicative of the climate zone in which the vehicle is located. Depending on this, it may be necessary to require a certain cooling capacity to prevent the processor from overheating. The traffic information may be indicative of how long the planned trip will take. Based on this, it is possible to predict how much energy must be present in the energy storage unit and thus how much computing power can be provided without negatively affecting the operation of the vehicle.

Preferably, the status data is additionally determined based on environmental information, the environmental information preferably comprising an outside temperature, weather conditions and/or a solar radiation level. In other words, it is also possible to react to external boundary conditions and to determine the provision of the computing power of the computing unit based on environmental information. Due to the required cooling power for the processing unit, the outside temperature can have an influence on the maximum possible processing power of the computing unit. The weather conditions (e.g. intensity of precipitation) can have an effect on the vehicle operation by virtue of requiring more assistance systems to ensure the operation of the vehicle. The level of sunlight can be indicative of the overall cooling power that the car has to supply. For example, with a high level of solar radiation, it can be assumed that the air conditioning system has to provide a certain cooling power. This cooling power may in turn be lacking in order to cool the computing unit. As a result, the solar radiation can also influence the computational power that can be provided from the computing unit. Thus, the vehicle can be equipped with photovoltaic cells and thus, for example, provide energy itself (e.g. feed it into the energy storage unit and/or make it available directly to the computing unit). Thus, the provided computing power can be provided based on the current and/or expected solar radiation.

Preferably, the status data is additionally determined based on a user command. In other words, the user can influence how much computing power is provided. The user can interact, for example via a user interface in the vehicle, with a control unit which controls the provision of the computing power. For example, the user can choose between different variants or profiles. One variant can be an eco-variant, in which all vehicle assistance systems can be used without restriction. In this case only surplus computing power of the computing unit is made available. In addition to the utilization of the computing unit (i.e. the GPU and/or the CPU), the state of charge of the energy storage unit is taken into account. The computing power is limited in such a way that, due to intelligent and dynamic route planning, no significant restrictions on the operation of the vehicle occur.

For example, due to the loading on a charging station, an intermediate charge is scheduled on the journey to it, and computing power is accordingly dynamically increased and provided during the actual charging. A second variant can be a pro-variant in which all convenience assistance systems are deactivated. However, these can be re-activated (i.e. overridden) by the user at any time if required. Such an activation can be activated, for example, by double selection (i.e. by pressing a switch twice). Here, the user can be informed that the available computing power is dynamically reduced when the user activates an assistance system. In the dynamic route planning, priority can be given to maximum computing power. The effect on the range can be displayed to the user when planning the route. Furthermore, a third variant may be provided as a 'green' variant. In this variant the focus can be placed on provided computing power which can be provided with renewable energy. A minimum capacity of the energy storage unit can be stored in the vehicle (for example, in case of an emergency, short-term operations, etc.). In addition, the required capacities for the provision of computing power can be created on the basis of dynamic route planning. For this purpose, calendars and/or a weekly schedule of the user can be taken into account. The aim is to use only surplus energy with a low $CO_2$ footprint to provide the computing power. In a fourth variant, the vehicle can be parked without charging the energy storage unit. Depending on the defined minimum capacity of the energy storage unit (for an emergency, short-term operations, etc.) and/or a planned route, computing power can be provided accordingly. In a fifth variant, the vehicle can be parked and the energy storage unit can be charged at the same time. In this case, a power consumption of the computing unit can be negligible. Therefore, the maximum available computing power can be provided.

Preferably, the user command comprises a portion of the total capacity of the energy storage unit which is allowed to be used for the provided computing power. In other words, the user can determine what proportion of the energy stored in the energy storage unit can be used to provide computing power. Thus, the user can decide how much energy has to be held in store only (i.e. exclusively) for the operation of the vehicle and how much energy can be used for providing computing power. Thus, it can be ensured that a base level of energy capacity desired by the user is present in the energy storage unit, which can be used, for example, for operating the vehicle.

Preferably, the status data is additionally determined based on connectivity information, the connectivity information preferably comprising information about an available data bandwidth and/or network information. In other words, the vehicle can be connected to the internet via a network module while traveling, and thus can also accept computing jobs while traveling. Thus, computation jobs can be processed even without an existing network connection and as soon as a network connection is present again or the job is completed, the computation result can be transferred. In addition, the vehicle can be continuously connected to the internet while traveling using a network module via wireless data transmission, so that the computing power can be made available via a cloud and/or a network MGMT. The vehicle can, for example, access a database with pending computing jobs to decide, regardless of the driving situation (i.e. the operating information), which job will be processed by the computing power provided. The connectivity information can be used to find out what network availability and/or network speed are available. Based on this, a computing job can be selected. It is also conceivable that, for example, a previously determined route can be used to check what network availability and speeds are available during the journey. This means that it is possible to plan in advance when the vehicle can be connected to the internet and when it cannot be. Accordingly, computing packets can be exchanged during a connection to the internet and be processed, among other things, in connection-less situations. In addition, in a parked state, for example, a network analysis can be used to check the available network speed over time and combine it with a WLAN to optimize the network speed.

Preferably, the status data is additionally determined based on priority commands, the priority commands preferably comprising information about safety-relevant functions of the vehicle. In other words, an evaluation and prioritization of the computing power provided can always take place in the background (e.g. in real time parallel to the normal operation of the vehicle). Safety-relevant functions such as emergency braking assistant can always have a higher priority. The computing power provided can be determined dynamically on this basis. In other words, the computing power provided can be determined as a result of the total computing power of the computing unit minus the dynamic safety-relevant computing power minus the optional convenience functions. In addition, safety-related functions of the vehicle may also include an anti-lock braking system and/or an electronic stability control.

Preferably, the method further comprises predicting the computing power available in future based on the status data and/or expected status data. In other words, computing power that can be provided in the future can also be determined, and thus a provision of computing power over a longer period of time can be planned. For example, it is conceivable that a user might enter their planned route into a navigation system. Based on the route, the control unit can determine what level of computing power is required for the operation of the vehicle at which point of the route. This process can also take user preferences into account. Thus, it can be defined in advance how much computing power can be provided. The computing power that can be made available in the future can be based on the currently prevailing status data. In other words, from the past to the present moment in time, the status data can be taken into account and extrapolated into the future. In addition, expected status data can be determined and available computing power can therefore be determined based on the future expected status data (for example, depending on the position of the vehicle on the planned route). Furthermore, the computing power that will be available in the future can also only be determined on the basis of the expected status data. In this case, only the prevailing status data at the respective point of the route is used to determine the available computing power.

Preferably, the method further comprises receiving at least one computing job, in particular via an existing network connection, which can be processed with the computing power provided from the computing unit, and processing the at least one computing job by means of the computing unit of the vehicle in order to obtain at least one computation result. For example, a computing job can be requested over a network such as a cloud. In addition, a computing job can also be calculations within a blockchain network. For example, a proof-of-work mechanism or a proof-of-stake mechanism can be referred to as a computing job. For example, a computing job can be transmitted to the vehicle wirelessly via the internet or mobile radio. Furthermore, it is conceivable to transfer a computing job via a cable (for example during charging or refueling). The computing job can then be stored in the vehicle and processed by the computing unit. The computation result can be output directly following the calculation or at a later time, when, for example, a cable connection or a good wireless connection is available.

Preferably, the computation result is output in full or in parts. In other words, the computation result can be output block-by-block (i.e. partially) as soon as it is calculated. This is particularly recommended when multiple computing units are interconnected to form a virtual data center and work together on a computing task. Alternatively, the computation result can also be output in full once the work order has been fully processed.

Preferably, the computing power provided is used to process asynchronous jobs. Asynchronous jobs can be understood to mean an asynchronous communication between the computing unit and another system. The asynchronous communication can be a mode of communication between the computing unit and a system providing the work order, in which the sending and receiving of the work order and the computation result respectively takes place in a time-shifted manner and without blocking the processing of the work order, for example by waiting for a response. This is particularly advantageous if no communication is possible between the computing unit and the transmission system during processing of a computing job by the computing unit.

Preferably, the method further comprises determining compensation information, on the basis of the computing power provided and/or a computation result, and outputting the compensation information. In other words, the compensation information can be based on how much computing power is provided over what period of time. In addition, the compensation information can be based on the computation result provided. For example, a higher remuneration can be paid for a particularly complex computation result than for a simple computation result. Preferably, only the computing power that is actually used is taken into account. In other words, a remuneration system can thus be provided which is designed to pay compensation for the computing operations carried out by the computing unit in the vehicle. The remuneration system can define a certain level of compensation, which depends in particular on the speed (i.e. the time in which a computing job can be processed). The time can depend on the available computing power, which can depend on environmental conditions (such as traffic, weather conditions, temperature, battery charge, battery status (aging, temperature, voltage state), state of charge (charging power, charging temperature), cooling power/temperature, driving status) driving speed, etc.). This means that the compensation can be higher if the computational operations are available sooner, i.e. more computing power is available. The remuneration system can also determine the compensation as a function of the energy available in the energy storage unit and how much it costs. For example, a decision in favor of a computing job may depend, among other things, on whether the computing unit is operated with green energy (for example, green electricity or green hydrogen) or normal energy. Furthermore, the remuneration system can also access the current energy prices and thus decide whether and which computing job will result in lucrative remuneration. Preferably, the remuneration information is output to a central office, through which a user can account for the computing power provided.

Preferably, the compensation information includes information about compensation for the computing power provided and the compensation is preferably dependent on a characterization of the stored energy. In other words, compensation for computing power provided may be higher if energy from the energy storage unit is used that has no or only a low CO2 footprint. For example, a CO2 limit can be defined, above which a higher compensation is paid (i.e. the lower the limit, the higher the compensation).

Preferably, the computing power is provided via a cloud network. Thus, the method can connect a computing unit of a vehicle via a network module integrated in the vehicle to a network, for example, so that computing jobs can be assigned to the computing unit. The computing operation can be accepted while stationary, e.g. when charging at a charging station which is connected to the cloud via a network, and executed without a constant data transmission while the vehicle is traveling and the (partial) result can be returned at the next charging station and loaded back into the cloud via the network existing there. The cloud in this case can describe a model that, for example, provides computer resources as a service, for example in the form of servers, data stores or applications that are shared, for example, over the internet in near real-time with little effort and in a device-independent manner and that charges according to use.

Preferably, the method further comprises determining an available cooling power of the computing unit based on the status data and providing computing power from the computing unit of the vehicle based on the status data and on the available cooling power of the computing unit. Preferably, depending on the computing power, the vehicle is equipped with a fluid cooling system (for example, a water-glycol mixture, lubricating oil, or similar). However, it is also conceivable to provide any other cooling device in the vehicle, which is capable of cooling the computing unit. The cooling power of the cooling device can in turn depend on the operating/driving status of the vehicle. The fluid cooling system may, for example, include a refrigerant circuit in addition to one or more coolant circuits. This may include a device for compressing the refrigerant (for example, compressor), a device for de-pressurizing the refrigerant (for example, expansion valve), a device for heating or evaporating the refrigerant (e.g. an evaporator) and a device for cooling or liquefying the refrigerant (e.g. liquefier, condenser). The coolant circuit can function similarly to an air conditioning system and be designed to provide cooling for the computing unit by means of the cooling process running in it. Furthermore, it is conceivable that the coolant circuit replaces an air conditioning system in the vehicle, so that no air conditioning needs to be provided in the vehicle. However, the cooling power enhanced by the refrigerant circuit requires considerable energy consumption and is also dependent on the driving status of the vehicle, as a higher driving speed allows better heat dissipation. Thus, the computing power provided can be made available depending on the available cooling power and the computing power required for the operation of the vehicle. In addition, the available energy from the energy storage unit, or the costs of this and the revenue (see the compensation information above) for the computing power provided, can be expressed as a ratio and it can be decided whether and how much computing power is made available to the external network (e.g. a cloud network).

Preferably, the method further comprises determining a target cooling power at which sufficient computing power can be provided that the operating efficiency of the computing unit is maximized. In the present case, the efficiency can be defined by providing just so much computing power so that a specific heat dissipation of the computing unit is necessary, so that the cooling unit does not require an excessive amount of energy. Preferably, the compensation (i.e. the compensation information) that can be achieved by providing the computing power can be used as a guideline here. This can be expressed as a ratio to the costs of the energy required to cool the computing unit.

According to a further aspect of the present disclosure, a control unit is provided for controlling the provision of computing power of a vehicle, wherein the control unit is designed to carry out the method according to any of the above embodiments. The control unit can be an internal computing unit, which can also be called Pro AI.

According to a further aspect of the present disclosure, a set of power electronics comprising the above control unit is provided. The power electronics can, for example, be part of an E-axle, which is designed to be installed in an electric vehicle.

According to a further aspect, a vehicle, in particular an electric vehicle or hybrid vehicle, is provided, which comprises the above control unit. The vehicle may have an energy storage unit such as an accumulator. In addition, the vehicle can be an autonomously driven vehicle.

Individual features or embodiments may be combined with other features or other embodiments to form new embodiments. Advantages and embodiment which are mentioned in connection with the features or the embodiments, also apply analogously to the new embodiments. Advantages and embodiments which were mentioned in connection with the method, also apply analogously to the device and vice versa.

In the following, preferred embodiments of the present disclosure are described in detail with reference to the accompanying figures.

DETAILED DESCRIPTION

Figure 1:
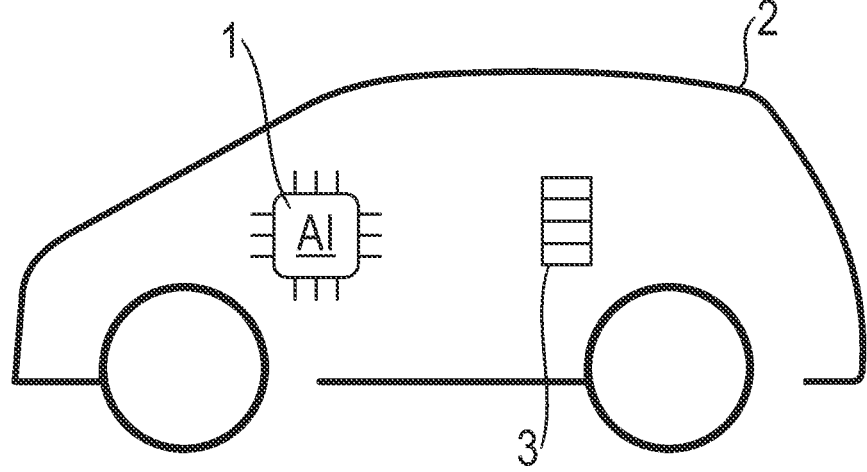
FIG. 1 is a schematic view of a vehicle in accordance with an embodiment of the present disclosure.

FIG. 1 is a schematic view of a vehicle 2 according to a first embodiment of the present disclosure. The vehicle 2 comprises a computing unit 1 and an energy storage unit 3. In a preferred embodiment, the vehicle is an at least partially electrically and at least partially autonomously driven vehicle. The computing unit 1 of the vehicle 2 is used for various functions (such as the autonomous driving). In other words, the computing unit 1 is not fully used, for example, when parking, driving slowly, partial automation or similar tasks. Thus, in such an operation of the vehicle 2, the full computing power of the computing unit 1 is not necessary for the operation of the vehicle. According to one aspect of the present disclosure, the computing unit 1 is used automatically to a certain extent for external computing tasks such as cloud computing, depending on the vehicle speed, environmental conditions (traffic, weather, temperatures, weather conditions), operational state of charge, degree/level of automation (which assistance systems are active), temperature of the computing unit. The computing power available to supply can also be predicted, for example, on the basis of a planned route and/or traffic analyses. Thus, computing jobs can be processed by any unused computing power. Computing jobs can be selected, for example, depending on the above boundary conditions. Furthermore, the driver (i.e. the user) of the vehicle 2 can independently specify what proportion of the computing power of the computing unit 1 they want to make available, and this can also be actively changed (i.e. "on the fly"). However, depending on the required driving comfort and driving safety, the vehicle 2 can adjust the computing power of the computer unit 1 again in such a way as to enable the safest and most comfortable possible driving. Furthermore, the vehicle has a network module (not shown in the figures) to connect the computing unit to a network. The computer jobs can be assigned via the network in order to use the computing unit 1 optimally between autonomous driving and computing operations. In addition, according to one aspect of the present disclosure, a remuneration system is provided that pays compensation for the computing power provided. If the vehicle 2 is parked, a higher computing power of the computing unit 1 can be provided for computing operations.

Figures 2A, 2B, 2C:
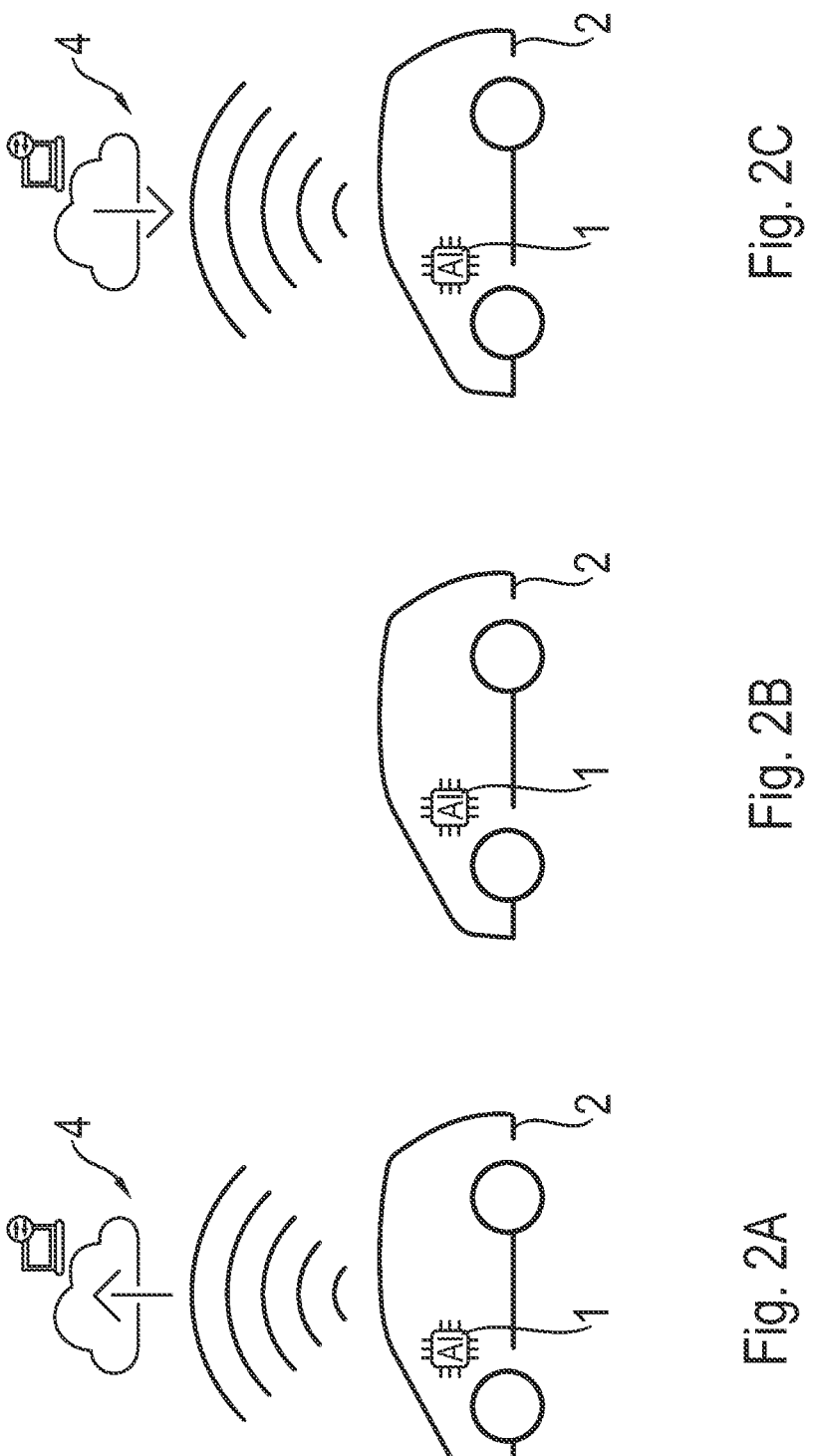
FIG. 2A, FIG. 2B, and FIG. 2C are schematic views of the vehicle according to an embodiment of the present disclosure during operation.

FIGS. 2A to 2C describe different operating situations of the vehicle 2. In FIG. 2A, the vehicle is connected wirelessly to a network 4. Such a connection can be implemented, for example, via mobile radio or WLAN. The vehicle or the control unit 1 receives a computing job via the network 4. This computing job is stored in a memory unit in the vehicle 2. Depending on the status data, the processing unit 1 can then process the computing job. In FIG. 2B, the vehicle 2 has no connection to the network 4. This may be the case, for example, if the vehicle is moving and located in areas where it is not possible to connect to the network 4. In this situation, the computing unit 1 can process the previously received and stored computing job. In FIG. 2C, the computing job is output completely or partially to the network 4. This means that the vehicle can also be used in areas where there is no connection to the network 4.

Figure 3:
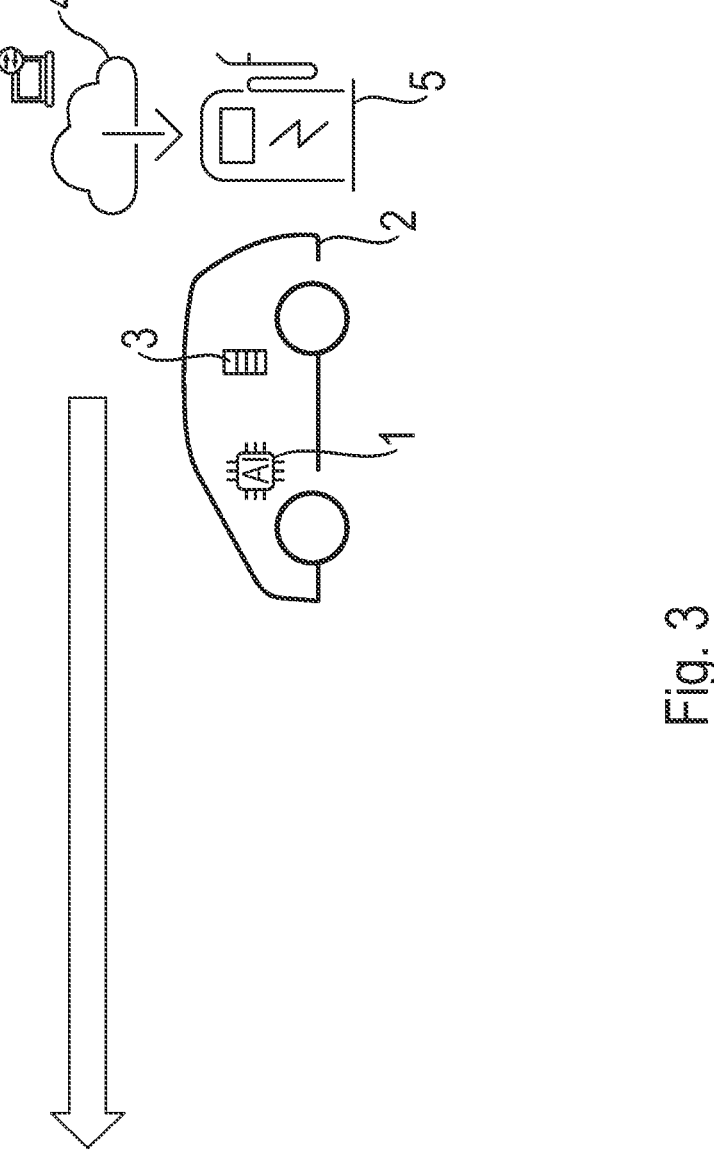
FIG. 3 is a schematic view of a vehicle in accordance with a further embodiment of the present disclosure during operation.
Figure 3:
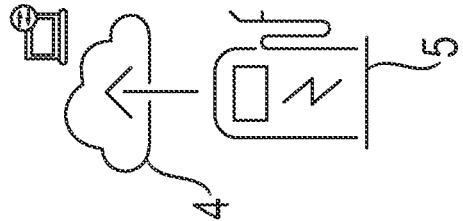

FIG. 3 shows a further operating state of the vehicle 2. In the present embodiment, the energy storage unit 3 of the vehicle is charged at an energy source 5. At the same time as the charging process, the vehicle 2 is connected to a network 4. In other words, the network 4 is only connected to the energy source 5 and can establish an indirect connection between vehicle 2 and network 4 via the energy source 5. In this case, the computing unit 1 accepts the computing job while the energy storage unit 3 is being refilled and after receiving the computing job can begin processing the same. The vehicle can either remain at the energy source 5 or be operated. There does not need to be a connection between the vehicle and network 4 during vehicle operation. If the vehicle reaches another energy source (for example, as shown on the left in FIG. 3), the computation result can be output to the network 4 again via the energy source 5.

Figure 4:
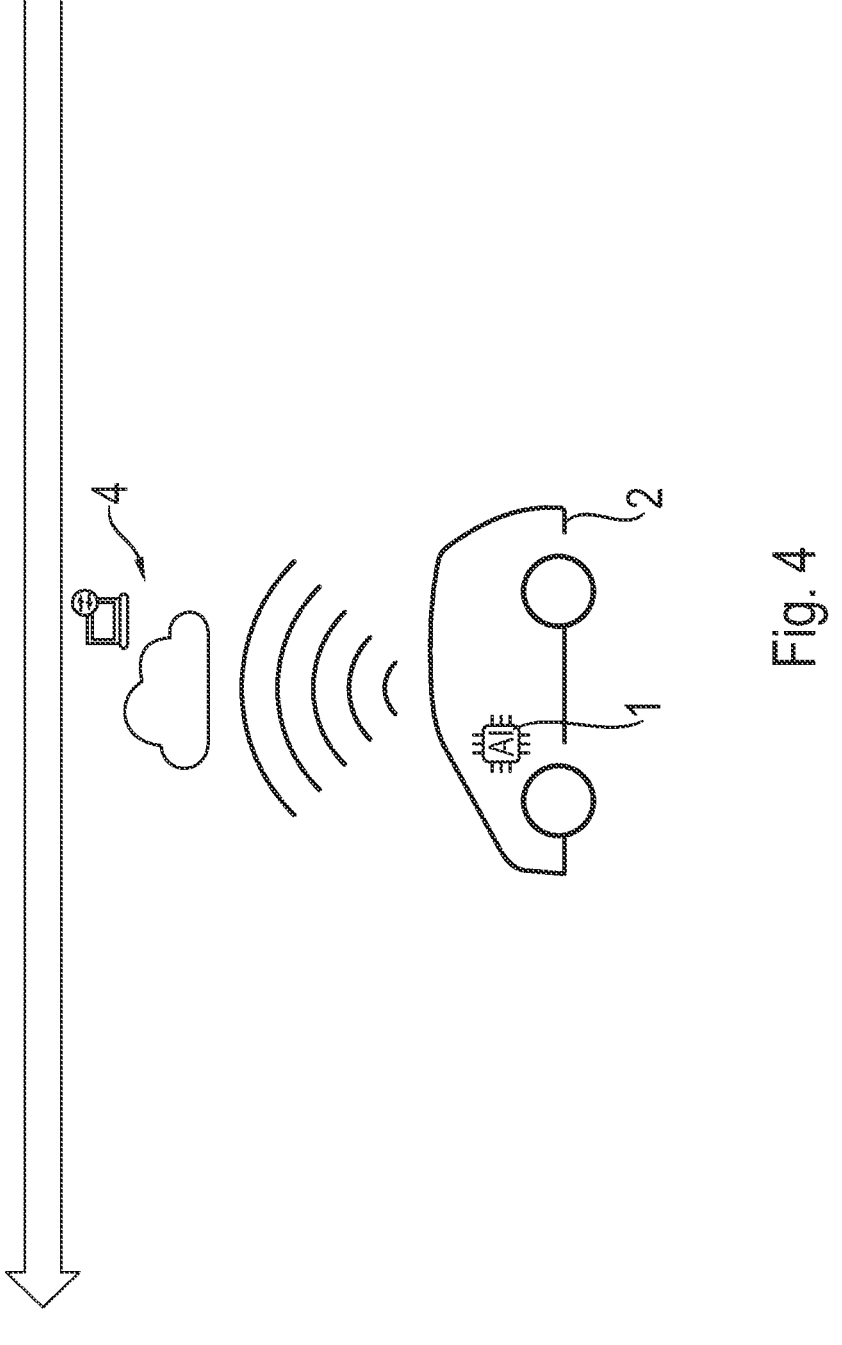
FIG. 4 is a schematic view of a vehicle according to a further embodiment of the present embodiment, during an operating state.

FIG. 4 is a further schematic view of a further embodiment of the present disclosure. In the present embodiment, the vehicle 2 has a permanent wireless connection to the network 4. For example, the connection can be implemented via the mobile radio network (for example, 5G). Thus, the computing unit 1 can communicate with the network permanently.

The network can be coupled with a remuneration system that is designed to compensate for the computing power provided. This can be realized in such a way that the computing operations carried out by the computing unit 1 are compensated for. The remuneration system can define a certain level of compensation, which in this case depends in particular on the speed, for example the time in which a computing job can be processed. The time depends on the available computing power, which depends on environmental conditions. This means that the compensation can be higher if the computational operation is completed sooner. In other words, if more computing power is provided. The remuneration system also determines the compensation depending on the energy available and how much it costs. For example, the decision in favor of a computing job depends, among other things, on whether the computing unit is powered by green energy (electricity from renewable energy sources, green hydrogen, etc.) or normal energy. Furthermore, the remuneration system can also access the current energy prices and thus decide whether and which computing job will result in lucrative remuneration. The compensation system may be applied to any of the above-mentioned embodiments.

Figure 5:
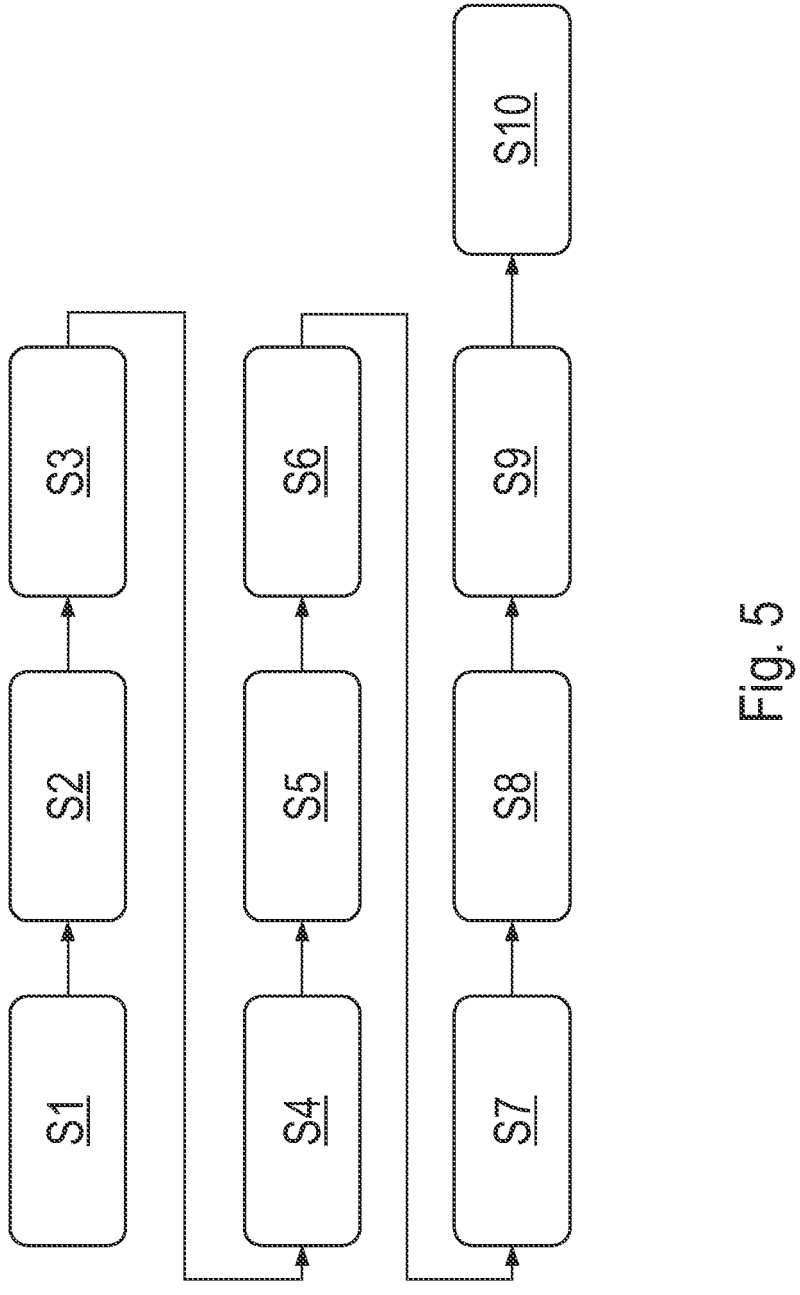
FIG. 5 is a flowchart showing schematically a sequence of a method according to an embodiment of the present disclosure.

FIG. 5 is a schematic flowchart showing the sequence of a method according to an embodiment of the present disclosure. In step S1, operating information of the vehicle 2 is recorded or acquired. In step S2, the status data is determined based on the operating information of the vehicle 2. In step S3, the computing power from the computing unit 1 of the vehicle 2 is then provided, based on the status data. With the computing power provided from the computing unit 1, a computing job can then be executed. In step S4, a computing power available in future is predicted based on the status data and/or expected status data. This enables the level of computing power that can be provided in the future to be determined. In step S5, at least one computing job is received, which can be processed with the computing power provided from the computing unit. In step S6, the computing job is processed and computation results are generated. In step S7, compensation information is determined based on the computing power provided and/or a computation result. In step S8, the compensation information is output. Thus, the user of the vehicle 2 can be compensated for the provided computing power. In step S9, an available cooling power of the processing unit is determined based on the status data. The computing power of the computing unit 1 is then provided based on the available cooling power. In step S10 a target cooling power is determined at which so much computing power can be provided that the operating efficiency of the computing unit is maximized. This ensures efficient utilization of the computing unit. The order of the individual steps may vary. In addition, the above sequence does not have to be followed and the individual steps can also be carried out in a different sequence.

LIST OF REFERENCE SIGNS

1 computing unit
2 vehicle
3 energy storage unit
4 network
5 charging station

The invention claimed is:

1. A computer-implemented method for providing computing power from a computing unit of a vehicle having an energy storage unit, the method comprising:

recording or acquiring operating information of the vehicle related to at least a degree of automation of the vehicle;

determining status data related to at least the degree of automation of the vehicle based on the operating information of the vehicle; and providing computing power from the computing unit of the vehicle to a cloud network to provide computing power for processing of one or more computing jobs based on the status data and the degree of automation of the vehicle.

2. The method as claimed in claim 1, comprising:

providing the computing power of the computing unit dynamically based on continuously updated status data.

3. The method as claimed in claim 1, wherein the operating information comprises a state of charge of the energy storage unit, a status of the energy storage unit, a characterization of stored energy, a vehicle speed, an automation level of the vehicle, a temperature of the computing unit, and/or a driving state of the vehicle.

4. The method as claimed in claim 1, wherein the operating information comprises a characterization of stored energy, and wherein the characterization of the stored energy includes information about a $CO_2$ footprint of the stored energy.

5. The method as claimed in claim 1, comprising:

determining the status data additionally based on travel information, wherein the travel information comprises a planned route, a current position of the vehicle, and/or traffic information.

6. The method as claimed in claim 1, comprising:

determining the status data additionally based on environmental information, wherein the environmental information comprises an outside temperature, a weather condition, and/or a solar radiation level.

7. The method as claimed in claim 1, comprising:

determining the status data additionally based on a user command.

8. The method as claimed in claim 1, comprising:

determining the status data additionally based on connectivity information, wherein the connectivity information comprises information about an available data bandwidth and/or network information.

9. The method as claimed in claim 1, comprising:

determining the status data additionally based on prioritization commands, wherein the prioritization commands comprise information about safety-relevant functions of the vehicle.

10. The method as claimed in claim 1, comprising:

predicting computing power available in a future based on the status data and/or an expected status data.

11. The method as claimed in claim 1, comprising:

receiving at least one computing job via an existing network connection, which computing job can be processed with the computing power provided from the computing unit; and processing the at least one computing job by the computing unit of the vehicle in order to achieve at least one computation result.

12. The method as claimed in claim 1, comprising:

determining compensation information based on the computing power provided and/or a computation result; and outputting the compensation information.

13. A control unit for controlling provision of computing power of a vehicle, wherein the control unit is configured to:

record or acquire operating information of the vehicle related to at least a degree of automation of the vehicle;

determine status data related to at least the degree of automation of the vehicle based on the operating information of the vehicle; and provide computing power from a computing unit of the vehicle to a cloud network to provide computing power for processing of one or more computing jobs based on the status data and the degree of automation of the vehicle.

14. The control unit as claimed in claim 13, wherein the control unit is configured to:

provide the computing power of the computing unit dynamically based on continuously updated status data.

15. The control unit as claimed in claim 13, wherein the operating information comprises a characterization of stored energy, and wherein the characterization of the stored energy includes information about a $CO_2$ footprint of the stored energy.

16. The control unit as claimed in claim 13, wherein the control unit is configured to:

determine the status data additionally based on travel information, wherein the travel information comprises a planned route, a current position of the vehicle, and/or traffic information.

17. The control unit as claimed in claim 13, wherein the control unit is configured to:

determine the status data additionally based on environmental information, wherein the environmental information comprises an outside temperature, a weather condition, and/or a solar radiation level.

18. The control unit as claimed in claim 13, wherein the control unit is configured to:

determine the status data additionally based on connectivity information, wherein the connectivity information comprises information about an available data bandwidth and/or network information.

19. The control unit as claimed in claim 13, wherein the control unit is configured to:

determine the status data additionally based on prioritization commands, wherein the prioritization commands comprise information about safety-relevant functions of the vehicle.

20. An at least partially autonomous vehicle comprising: the control unit as claimed in claim 13.

* * * * *